(12) United States Patent
Ghafoor et al.

(10) Patent No.: US 11,551,079 B2
(45) Date of Patent: Jan. 10, 2023

(54) GENERATING LABELED TRAINING IMAGES FOR USE IN TRAINING A COMPUTATIONAL NEURAL NETWORK FOR OBJECT OR ACTION RECOGNITION

(71) Applicant: STANDARD COGNITION, CORP., San Francisco, CA (US)

(72) Inventors: Razwan Ghafoor, Sutton Coldfield (GB); Peter Rennert, Dunblane (GB); Hichame Moriceau, London (GB)

(73) Assignee: STANDARD COGNITION, CORP., San Francisco, CA (US)

( * ) Notice: Subject to any disclaimer, the term of this patent is extended or adjusted under 35 U.S.C. 154(b) by 657 days.

(21) Appl. No.: 16/489,867

(22) PCT Filed: Mar. 1, 2018

(86) PCT No.: PCT/GB2018/050536
§ 371 (c)(1),
(2) Date: Aug. 29, 2019

(87) PCT Pub. No.: WO2018/158584
PCT Pub. Date: Sep. 7, 2018

(65) Prior Publication Data
US 2019/0392318 A1     Dec. 26, 2019

(30) Foreign Application Priority Data

Mar. 1, 2017   (GB) ...................................... 1703330

(51) Int. Cl.
*G06N 3/08* (2006.01)
*G06F 17/18* (2006.01)
(Continued)

(52) U.S. Cl.
CPC ............... *G06N 3/08* (2013.01); *G06F 17/18* (2013.01); *G06K 9/628* (2013.01); *G06K 9/6256* (2013.01); *G06N 3/0472* (2013.01)

(58) Field of Classification Search
CPC ..... G06V 10/82; G06V 10/255; G06K 9/6256
See application file for complete search history.

(56) References Cited

U.S. PATENT DOCUMENTS 6,154,559 A    11/2000   Beardsley
6,236,736 B1    5/2001   Crabtree et al.
(Continued)

FOREIGN PATENT DOCUMENTS

CN    104850846 A    8/2015
CN    105069413 A   11/2015
(Continued)

OTHER PUBLICATIONS

Search Report, counterpart International Appl. No. GB1703330.9, dated Feb. 14, 2018.
(Continued)

*Primary Examiner* — Ross Varndell
(74) *Attorney, Agent, or Firm* — Haynes Beffel & Wolfeld LLP; Andrew L. Dunlap

(57) ABSTRACT

A system for training a computational neural network to recognise objects and/or actions from images, the system comprising: a training unit, comprising: an input interface configured to receive: a plurality of images captured from one or more cameras, each image having an associated timestamp indicating the time the image was captured; a data stream containing a plurality of timestamps each associated with an object and/or action; the data stream being generated by a system in an operative field of view of the one or more cameras; an image identification unit configured to identify from the plurality of images a set of images that (Continued)

each have a timestamp that correlates to a timestamp associated with an object and/or action from the data stream; a data-labelling unit configured to determine, for each image of the set of images, an image label that indicates the probability the image depicts: (i) an object of each of a set of one or more specified object classes; and/or (ii) a specified human action in dependence on the correlation between the timestamp for the image and the timestamp associated with the object and/or action from the data stream; and an output interface configured to output the image labels for use in training a computational neural network to identify from images objects of the object classes and/or the specified actions.

18 Claims, 5 Drawing Sheets

(51) Int. Cl.
   *G06K 9/62* (2022.01)
   *G06N 3/04* (2006.01)

(56) References Cited

U.S. PATENT DOCUMENTS

| | | | |
|---|---|---|---|
| 7,050,624 B2 | 5/2006 | Dialameh et al. |
| 8,009,863 B1 | 8/2011 | Sharma et al. |
| 8,098,888 B1 | 1/2012 | Mummareddy et al. |
| 8,577,705 B1 | 11/2013 | Baboo et al. |
| 9,058,523 B2 | 6/2015 | Merkel et al. |
| 9,124,778 B1 | 9/2015 | Crabtree |
| 9,256,807 B1 | 2/2016 | Shlens et al. |
| 9,262,681 B1 | 2/2016 | Mishra |
| 9,449,233 B2 | 9/2016 | Taylor |
| 9,536,177 B2 | 1/2017 | Chalasani et al. |
| 9,582,891 B2 | 2/2017 | Geiger et al. |
| 9,881,221 B2 | 1/2018 | Bala et al. |
| 9,911,290 B1 | 3/2018 | Zalewski et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,438,277 B1 | 10/2019 | Jiang et al. |
| 10,474,988 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,776,926 B2 | 9/2020 | Shrivastava |
| 2003/0107649 A1 | 6/2003 | Flickner et al. |
| 2004/0131254 A1 | 7/2004 | Liang et al. |
| 2005/0177446 A1 | 8/2005 | Hoblit |
| 2005/0201612 A1 | 9/2005 | Park et al. |
| 2007/0182718 A1 | 8/2007 | Schoener et al. |
| 2008/0159634 A1 | 7/2008 | Sharma et al. |
| 2008/0208698 A1 | 8/2008 | Olson et al. |
| 2008/0211915 A1 | 9/2008 | McCubbrey |
| 2009/0041297 A1 | 2/2009 | Zhang et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2010/0103104 A1 | 4/2010 | Son et al. |
| 2010/0208941 A1 | 8/2010 | Broaddus et al. |
| 2010/0217678 A1 | 8/2010 | Goncalves |
| 2011/0228976 A1 | 9/2011 | Fitzgibbon et al. |
| 2011/0317012 A1 | 12/2011 | Hammadou |
| 2011/0320322 A1 | 12/2011 | Roslak et al. |
| 2012/0159290 A1 | 6/2012 | Pulsipher et al. |
| 2012/0206337 A1 | 8/2012 | Hildreth et al. |
| 2013/0011049 A1 | 1/2013 | Kimura |
| 2013/0076898 A1 | 3/2013 | Philippe et al. |
| 2013/0156260 A1 | 6/2013 | Craig |
| 2013/0182114 A1 | 7/2013 | Zhang et al. |
| 2014/0219550 A1 | 8/2014 | Popa et al. |
| 2014/0282162 A1 | 9/2014 | Fein et al. |
| 2015/0002675 A1 | 1/2015 | Kundu et al. |
| 2015/0012396 A1 | 1/2015 | Puerini et al. |
| 2015/0019391 A1 | 1/2015 | Kumar et al. |
| 2015/0026646 A1 | 1/2015 | Ahn et al. |
| 2015/0039458 A1 | 2/2015 | Reid |
| 2015/0206188 A1 | 7/2015 | Tanigawa et al. |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0302593 A1 | 10/2015 | Mazurenko et al. |
| 2015/0379366 A1 | 12/2015 | Nomura et al. |
| 2016/0125245 A1 | 5/2016 | Saitwal et al. |
| 2016/0189286 A1 | 6/2016 | Zohar et al. |
| 2016/0203525 A1 | 7/2016 | Hara et al. |
| 2016/0217417 A1 | 7/2016 | Ma et al. |
| 2016/0259994 A1 | 9/2016 | Ravindran et al. |
| 2017/0024806 A1 | 1/2017 | High et al. |
| 2017/0116473 A1 | 4/2017 | Sashida et al. |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0206669 A1 | 7/2017 | Saleemi et al. |
| 2017/0249339 A1 | 8/2017 | Lester |
| 2017/0278255 A1 | 9/2017 | Shingu et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0240180 A1 | 8/2018 | Glaser et al. |
| 2018/0322616 A1 | 11/2018 | Guigues |
| 2018/0332235 A1 | 11/2018 | Glaser |
| 2018/0332236 A1 | 11/2018 | Glaser et al. |
| 2018/0343417 A1 | 11/2018 | Davey |
| 2018/0373928 A1 | 12/2018 | Glaser et al. |
| 2019/0005479 A1 | 1/2019 | Glaser et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0156274 A1 | 5/2019 | Fisher et al. |
| 2019/0156275 A1 | 5/2019 | Fisher et al. |
| 2019/0188876 A1 | 6/2019 | Song et al. |
| 2019/0251340 A1 | 8/2019 | Brown et al. |
| 2019/0377957 A1 | 12/2019 | Johnston et al. |
| 2020/0074393 A1 | 3/2020 | Fisher et al. |
| 2020/0258241 A1 | 8/2020 | Liu et al. |
| 2020/0410713 A1 | 12/2020 | Auer et al. |
| 2022/0156827 A1* | 5/2022 | Glaser .................. G06V 20/52 |

FOREIGN PATENT DOCUMENTS

| | | |
|---|---|---|
| CN | 104778690 B | 6/2017 |
| EP | 1574986 B1 | 7/2008 |
| EP | 2555162 A1 | 2/2013 |
| EP | 3002710 A1 | 4/2016 |
| JP | H11175730 A | 7/1999 |
| JP | 2004171240 A | 6/2004 |
| JP | 2004171241 A | 6/2004 |
| JP | 2004348618 A | 12/2004 |
| JP | 2009055139 A | 3/2009 |
| JP | 2009265922 A | 11/2009 |
| JP | 2010002997 A | 1/2010 |
| JP | 2012123667 A | 6/2012 |
| JP | 2012147083 A | 8/2012 |
| JP | 2013196199 A | 9/2013 |
| JP | 2014089626 A | 5/2014 |
| JP | 2015149559 A | 8/2015 |
| JP | 2016144049 A | 8/2016 |

(56) References Cited

FOREIGN PATENT DOCUMENTS

| | | |
|---|---|---|
| JP | 2016532932 A | 10/2016 |
| JP | 2017059945 A | 3/2017 |
| JP | 2017062776 A | 3/2017 |
| KR | 10-2019-0093733 A | 8/2019 |
| KR | 102223570 B1 | 3/2021 |
| TW | 201228380 A | 7/2012 |
| WO | 0021021 A1 | 4/2000 |
| WO | 0243352 A2 | 5/2002 |
| WO | 02059836 A3 | 5/2003 |
| WO | 2008029159 A1 | 3/2008 |
| WO | 2013041444 A1 | 3/2013 |
| WO | 2015017796 A2 | 2/2015 |
| WO | WO2015017796 A2 | 2/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2019032304 A1 | 2/2019 |
| WO | 2019032305 A2 | 2/2019 |
| WO | 2019032306 A1 | 2/2019 |
| WO | 2019032307 A1 | 2/2019 |

OTHER PUBLICATIONS

International Search Report and Written Opinion, counterpart International Appl. No PCT/GB2018/050536, dated May 24, 2018.
Insafutdinov, Eldar et al., Deeper Cut: A Deeper, Stronger, and Faster Multi-Person Pose Estimation Model, http://pose.mpi-inf.mpg.de, dated Nov. 30, 2016.
Sheeney De Moraes, Marcel et al., Deep Convolutional Poses for Human Interaction Recognition in Monocular Videos, School of Engineering & Physical Sciences, Heriot-Watt University, dated Dec. 13, 2016.
Shigeyuki Odashima et al., "Object Movement Management System via Integration of Stable Image Changes in Multiple Viewpoints", Journal of the Robotics Society of Japan, 2011, vol. 29, Issue 9, pp. 837-848 (Abstract Translation Only* ).
Black et al.: "Multi view image surveillance and tracking", Motion and Video Computing, 2002. Proceedings. Workshop on Dec. 5-6, 2002, Jan. 1, 2002 (Jan. 1, 2002), pp. 169-174.
GB 1703330.9—Second Examination Report, dated Jul. 22, 2022, 4 pages.
GB 2118942.8—First Examination Report, dated Jun. 7, 2022, 5 pages.
Germann et al., "Space-Time Body Pose Estimation in Uncontrolled Environments," 2011 International Conference on 3D Imaging, Modeling, Processing, Visualization and Transmission, May 2011, pp. 244-251.
Iqbal et al., "PoseTrack: Joint Multi-Person Pose Estimation and Tracking," Proceedings of the IEEE Conference on Computer Vision and Pattern Recognition (CVPR), Jul. 26, 2017, 12 pages.
JP 2020-507520—First Office Action with translation dated Jul. 26, 2022, 11 pages.
JP Office Action from JP 2020-507521—First Office Action with translation dated Aug. 2, 2022, 9 pages.
JP Office Action from JP 2020-507550—Office Action with translation dated Aug. 16, 2022, 6 pages.
JP Office Action from JP 2020-507669—First Office Action with translation, dated Aug. 2, 2022, 13 pages.
Liu et al., "Customer Behavior Recognition in Retail Store from Surveillance Camera", 2015 IEEE International Symposium on Multimedia (ISM), United States, IEEE, Dec. 14, 2015, pp. 154 to 159.
Vincze, "Robust tracking of ellipses at frame rate," Pattern Recognition, vol. 34, Issue 2, Feb. 2001, pp. 487-498.
Zhang "A Flexible New Technique for Camera Calibration," IEEE Transactions on Pattern Analysis and Machine Intelligence, vol. 22, No. 11, Nov. 2000, 22pages.
U.S. Appl. No. 17/195,495—Notice of Allowance dated Jul. 8, 2021, 12 pages.
U.S. Appl. No. 17/195,495—Notice of Allowance dated Oct. 26, 2021, 18 pages.
EP 18844509.2—Rules 161(2) and 162 Communication, dated Mar. 17, 2020, 3 pages.
EP 18844509.2—Response to Rules 161(2) and 162 Communication, filed Sep. 3, 2020, 11 pages.
Lee et al., Monitoring Activities from Activities from multiple video streams: Establishing a common coordinate frame, IEEE Transactions on Pattern Analysis and Machine Intelligence, IEEE Computer Society, vol. 22, No. 8, dated Aug. 1, 2000, pp. 758-767, 10 pages.
Hofmann et al., Hypergraphs for Joint Multi-view Reconstruction and Multi-object Tracking, 2017, IEEE Conference on Computer Vision and Pattern Recognition, IEEE Computer Society, dated Jun. 23, 2013, pp. 3650-3657, 8 pages.
EP 18844509.2—Communication pursuant to Article 94(3), dated May 20, 2022, 6 pages.
EP-18844384.0—Communication pursuant to Article 94(3) EPC dated Apr. 21, 2022, 7 pages.
Cai Minjie et al., "An Ego-Vision System for Hand Grasp Analysis", IEEE Transactions on Human-Machine Systems, IEEE, Piscataway, NJ, USA, vol. 47, No. 4, Aug. 1, 2017 (Aug. 1, 2017), pp. 525-535, XP011656554, ISSN: 2168-2291, DOI: 10.1109/THMS.2017.2681423 [retrieved on Jul. 13, 2017], 12 pages.
EP 18843163.9—Communication pursuant to Article 94(3) EPC dated Apr. 21, 2022, 10 pages.
Gkioxar et al., "R-CNN's for Pose Estimation and Action Detection", <https://arxiv.org/pdf/1406.5212.pdf>, Jun. 19, 2014.
U.S. Appl. No. 16/492,781—Non-Final Office Action dated Feb. 2, 2021, 18 pages.
GB 1703914.0—Office Action dated Jul. 14, 2021, 5 pages.
GB 1703914.0—Search Report dated Jan. 18, 2018, 1 pages.
GB 1703914.0—Intention to Grant dated Nov. 29, 2021, 2 pages.
PCT/GB2018/050614—International Search Report and Written Opinion, dated Jun. 7, 2018, 8 pages.
PCT/GB2018/050614—International Preliminary Report on Patentability, dated Sep. 10, 2019, 6 pages.
EP 18711662—Rules 161(1) and 162 Comunication, dated Oct. 17, 2019, 3 pages.
EP 18711662—Response to Rules 161(1) and 162 Comunication dated Oct. 17, 2019, filed Apr. 9, 2020, 13 pages.
EP 18711662—First Exam Report (Article 94(3) Communication), dated Aug. 4, 2021, 6 pages.
EP 18711662—Response to First Exam Report pursuant to Article 94(3) dated Aug. 4, 2021, filed Dec. 3, 2021, 7 pages.
U.S. Appl. No. 16/492,781—Office Action dated Feb. 2, 2021, 15 pages.
Black et al., "Multi View Image Surveillance and Tracking," IEEE Proceedings of the Workshop on Motion and Video Computing, 2002, pp. 1-6.
GB 1703330.9—First Examination Report, dated Mar. 31, 2022, 7 pages.
EP 18709743.1—Office Action dated Mar. 11, 2021, 5 pages.
EP 18709743.1—Rules 161(1) and 162 Communication, dated Oct. 9, 2019, 3 pages.
EP 18709743.1—Response to Rules 161(1) and 162 Communication dated Oct. 9, 2019, filed Dec. 12, 2019, 19 pages.
EP 18709743.1—Response to Office Action dated Mar. 11, 2021, filed Dec. 13, 2021, 13 pages.
PCT/GB2018/050536—International Search Report, dated May 24, 2018, 3 pages.
PCT/GB2018/050536—Written Opinion, dated May 24, 2018, 7 pages.
PCT/GB2018/050536—International Preliminary Report on Patentability—Chapter 1, dated Sep. 3, 2019, 8 pages.
GB 1703330.9—Response to First Examination Report, dated May 30, 2022, 21 pages.
Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136, XP028804219, ISSN: 1047-3203, DOIO: 10.1016/J.JVCIR.2013.03.009.
EP 18843163.9—Extended European Search Report dated Nov. 27, 2020, 8 pages.

(56) References Cited

OTHER PUBLICATIONS

EP 18843486.4—Extended European Search Report dated Dec. 8, 2020, 8 pages.
EP 18844509.2—Extended European Search Report dated Dec. 8, 2020, 8 pages.
EP-18844384.0—European Extended Search Report dated Dec. 2, 2020, 7 pages.
Grinciunaite et al. "Human Pose Estimation in Space and Time Using 3D CNN," ECCV Workshop on Brave new ideas for motion representations in videos, Oct. 2016, 7 pages.
Harville, "Stereo person tracking with adaptive plan-view templates of height and occupancy statistics," Image and Mision Computing, vol. 22, Issue 2, Feb. 1, 2004, pp. 127-142.
He et al. "Identity mappings in deep residual networks" (published at https://arxiv.org/pdf/1603.05027.pdf), Jul. 25, 2016, 15 pages.
Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.
Jayabalan, et al., "Dynamic Action Recognition: A convolutional neural network model for temporally organized joint location data," Cornell University, Computer Science, Dec. 20, 2016, 11 pages.
Longuet-Higgens, "A computer algorithm for reconstructing a scene from two projections," Nature 293, Sep. 10, 1981, pp. 133-135.
Redmon et al., "You Only Look Once: Unified, Real-Time Object Detection," University of Washington, Allen Institute for Aly, Facebook AI Research, May 9, 2016, 10 pages.
Redmon et al., YOLO9000: Better, Faster, Stronger, (available at https://arxiv.org/pdf/1612.08242.pdf), Dec. 25, 2016, 9 pages.
Rossi et al., "Tracking and Counting Moving People," IEEE Int'l Conf. on Image Processing, ICIP-94, Nov. 13-16, 1994, 5 pages.
Symons, "Data Fusion Methods for Netted Sensors with Limited Communication Bandwidth", QinetiQ Ltd and University College London, 2004.
Toshev et al. "DeepPose: Human Pose Estimation via Deep Neural Networks," IEEE Conf. on Computer Vision and Pattern Recognition, Aug. 2014, 8 pages.
U.S. Appl. No. 15/945,473—Response to Final Office Action dated Apr. 23, 2019, 11 pages.
U.S. Appl. No. 15/847,796—Notice of Allowance dated May 10, 2018, 8 pages.
U.S. Appl. No. 15/907,112—Notice of Allowance dated Sep. 18, 2018, 7 pages.
U.S. Appl. No. 15/907,112—Office Action dated Jun. 26, 2018, 11 pages.
U.S. Appl. No. 15/907,112—Response to Office Action dated Jun. 26, 2018, filed Jul. 25, 2018, 10 pages.
U.S. Appl. No. 15/945,466—Notice of Allowance dated Aug. 31, 2018, 7 pages.
U.S. Appl. No. 15/945,466—Office Action dated Jul. 20, 2018, 12 pages.
U.S. Appl. No. 15/945,466—Response to Office Action dated Jul. 20, 2018, filed Jul. 25, 2018, 14 pages.
U.S. Appl. No. 15/945,473—Final Office Action dated Apr. 23, 2019, 9 pages.
U.S. Appl. No. 15/945,473—Notice of Allowance dated Jul. 9, 2019, 7 pages.
U.S. Appl. No. 15/945,473—Office Action dated Jan. 24, 2019, 8 pages.
U.S. Appl. No. 15/945,473—Office Action dated Aug. 8, 2018, 17 pages.
U.S. Appl. No. 15/945,473—Response to Final Office Action dated Apr. 23, 2019, filed Jun. 24, 2019, 13 pages.
U.S. Appl. No. 15/945,473—Response to Final Office Action, dated Jun. 24, 2019, 13 pages.
U.S. Appl. No. 15/945,473—Response to OA dated Jan. 24, 2019, filed Feb. 8, 2019, 17 pages.
U.S. Appl. No. 15/945,473—Response to Office Action dated Aug. 8, 2018, filed Oct. 2, 2018, 23 pages.
U.S. Appl. No. 15/945,473—Response to Office Action, dated Oct. 2, 2018, 23 pages.
U.S. Appl. No. 16/256,358—Notice of Allowance dated Jul. 22, 2019, 12 pages.
U.S. Appl. No. 16/256,358—Office Action dated Mar. 28, 2019, 7 pages.
U.S. Appl. No. 16/256,358—Response to Office Action, dated Jun. 25, 2019, 16 pages.
U.S. Appl. No. 16/256,361—Notice of Allowance dated Aug. 26, 2019, 17 pages.
U.S. Appl. No. 16/256,361—Office Action dated Apr. 4, 2019, 25 pages.
U.S. Appl. No. 16/256,361—Response to Office Action dated Apr. 4, 2019, filed Jul. 2, 2019, 14 pages.
U.S. Appl. No. 17/195,495—Office Action dated May 21, 2021, 34 pages.
U.S. Appl. No. 16/679,027—Office Action dated Jan. 6, 2021, 13 pages.

\* cited by examiner

GENERATING LABELED TRAINING IMAGES FOR USE IN TRAINING A COMPUTATIONAL NEURAL NETWORK FOR OBJECT OR ACTION RECOGNITION

The present application is the U.S. National Stage of PCT International Patent Application No. PCT/GB2018/050536, filed Mar. 1, 2018, which claims the benefit of and priority to Great Britain Application No. GB 1703330.9, filed Mar. 1, 2017, the contents of both of which are hereby incorporated herein by reference.

FIELD

This invention relates to techniques for generating labelled training data to train a computational neural network. More particularly, aspects of the present invention relate to techniques for generating labelled training data to train a computational neural network to classify and/or infer regressions in images.

BACKGROUND

Computer vision is a disciplinary field that addresses how computational methods can be employed to gain an understanding of information depicted in images, or videos. To do this, image data (e.g. in the form of single images, image sequences forming a video stream, images captured by a camera etc.) can be processed and analysed to extract information and/or data that can be used to make certain conclusions on what is depicted by those images. This information may then be used to classify the image into a (specified) class. For example, the image may be classified as depicting a certain type of object. Alternatively, the information may be used to generate a regression value indicating the value of a variable. For instance, the regression value may indicate the probability that the image depicts a certain specified action.

Image classification or regression may be performed computationally using a computational neural network. A neural network is a computational model that calculates and/or approximates one or more functions based on one or more inputs. The basic unit of computation in a neural network is a neuron. A neuron may also be referred to as a node. A neuron receives input(s) from other neurons in the network, or from an external source. Each input may be associated with a weight, and (depending on the type of neuron) the neuron then calculates an output by applying a function to the weighted sum of its inputs. The function applied by the neuron may be non-linear.

A neural network may contain multiple neurons arranged in layers. The layers are arranged so that neurons in a given layer do not communicate with each other. The neural network may comprise three distinct types of layers: an input layer, a hidden layer, and an output layer. The input layer is formed of neurons that provide inputs to the network. The input nodes may themselves not perform any computation. The hidden layer is formed of neurons that have no direct connection to the outside system. The neurons of the hidden layer perform computations to provide an output from one or more inputs. A neural network may be formed of one or more hidden layers. The output layer is formed of neurons that perform computations to provide outputs from the network. Arrangements are also possible in which the output layer additionally serves as an input layer for another network, and thus the output layer can be viewed as a hidden layer of a larger network. Such arrangements may be referred to as stacked arrangements.

Neural networks may be classed as recurrent networks, or non-recurrent networks. Non-recurrent networks are feed-forward networks in which each layer of the network is connected to every other layer in a feed-forward fashion (i.e. data propagates through the network in a single direction from the input layer to the output layer). In a non-recurrent network, each input is processed independently of all other inputs (and outputs) of the network. An example of a non-recurrent neural network is a convolutional neural network. Recurrent networks are a class of neural networks in which an input may be processed in dependence (at least in part) on previously computed outputs of the network. An example of a recurrent neural network is a long-short term memory (LSTM) network.

The output of a neural network may be in the form of an N-element vector or N-dimensional matrix, where each element of the vector/matrix indicates a probability of a certain classification of the input data. For example, in the case of image classification, an input image may be classified into one or more of N classes, where an image of each class may be said to depict a certain class of object, e.g. a cat, a dog, an item of food etc. The value of an element in the output vector then indicates a probability that the image belongs to that corresponding class. In the case the neural network is used for regression, output will be value that indicates a magnitude of regression. This value may be referred to as a regression value. The regression value may be a continuous variable capable of taking a range of values within a specified range. For instance, if the network is arranged so that the value indicates a probability that an image depicts a specified human action, the regression value may take a value from 0 to 1, where '1' indicates a probabilistic certainty that the image depicts the specified action.

In order to effectively use a computational neural network to classify input data, the neural network may be 'trained'. Training may refer to the process of configuring the parameters of the network (e.g. the weights used by each neuron) to enable the network to effectively classify input data not previously seen by the network.

One way to train a neural network is to use training data. The training data may be labelled—that is to say, for a given set of input data, the desired output vector or matrix is known. This known output may be referred to as the label for the input data. The input data can be fed into the neural network, which may have an initialised set of parameters. The output from the neural network is then compared to the known label for the input data to generate an error. The error may be back-propagated through the network and used to adjust the network parameters. The input data is then fed back into the neural network and new outputs calculated. These new outputs are again compared to the label to generate a new error (which should be smaller than the previous error). This new error is then back-propagated into the network to re-adjust the network parameters. This process may be repeated until a pre-defined threshold is reached (e.g. the error is below a predetermined threshold; the number of iterations has reached a threshold value or the process may be repeated until a threshold amount of time has elapsed). This process may also be repeated for multiple inputs to better train the network.

Whilst the use of labelled training data is effective in training computational neural networks, sufficient labelled training data is not always readily available. For instance, for image classification of security footage (e.g. CCTV footage), well-labelled data is not always readily available due to data protection and privacy requirements. Whilst it is possible to label data manually (e.g. by having a person watch the footage and label it accordingly), this is time consuming and expensive.

SUMMARY

According to one aspect of the present disclosure there is provided a method of training a computational neural network used by an object and/or action recognition system, the method comprising: receiving a data stream containing a plurality of timing indications each associated with an object and/or action; receiving a plurality of images each having associated timing indications; identifying a set of images from the plurality of images that each have a timing indication that correlates to a timing indication associated with an object and/or action; and determining, for each image of the set of images, a label comprising a value for a set of one or more variables corresponding to one or more object classes and/or specified actions in dependence on the correlation between the timing indication for the image and the timing indication associated with the object/or action.

The method may further comprise using the set of images and their labels to train the computational neural network to identify from images objects of the object classes and/or the specified actions.

The timing indications associated with each object and/or action and the timing indications for each image may be in the form of a timestamp, and the method further comprises synchronising the timestamps associated with the images with the timestamps associated with the objects and/or actions.

Each image of the set of images used to train the computational neural network may have a timestamp within a specified time interval of a timestamp associated with an object and/or action.

The step of identifying the set of images may comprise identifying a set of primary images each having an associated timestamp within a first specified time interval of a timestamp associated with an object and/or action.

The step of determining the values for the set of one or more variables may comprise, for each primary image: assigning to the image a first set of values for the one or more variables.

The step of identifying the set of images may further comprise, for each primary image, identifying a subset of secondary images having a timestamp within a second specified time interval of the timestamp for the primary image.

The step of determining the values for the set of one or more variables may further comprise, for each subset of secondary images, assigning to each image in the subset values for the one or more variables determined from the first set of values for those variables assigned to the primary image for that subset.

The values for the one or more variables for each image in the subset of secondary images may be further determined from the difference between the timestamp of the image and the timestamp of the primary image for the subset.

The data stream may contain information on a plurality of objects and timing indications associated with each object; each of the plurality of objects may be depicted in at least one image of the plurality of images; and the set of identified images may each have timing indications that correlate to timing indications associated with an object.

The method may further comprise categorising each object into an object class of a set of object classes using the information in the data stream on that object, and the set of one or more variable values for each image may form a classification label indicating a probability for each class in the set of object classes that the image depicts an object of that class.

The classification label for each image may be determined from the categorisation of the object having a timing indication that correlates to the timing indication for that image.

The step of determining the classification labels may comprise, for each primary image: assigning to the image a first probability that the image depicts an object of the object class into which the object having a timestamp within the first specified time interval of the image has been categorised.

The step of determining the classification labels may further comprise, for each subset of secondary images, assigning to each image in the subset a probability that the image depicts an object of the same object class as the primary image for that subset.

The set of one or more variable values for each image may comprise a value indicating a probability that the image depicts a person performing the specified action.

The step of determining the classification labels may comprise, for each primary image: assigning to the image a first probability that the image depicts a person performing the specified action.

The step of determining the classification labels may further comprise, for each subset of secondary images, assigning to each image in the subset a probability that the image depicts the same specified action as the primary image for that subset.

The data stream may be generated independently of the plurality of images.

The data stream may be generated by a system in view of a camera used to capture the plurality of images.

The data stream may be generated by a point-of-sale system in view of the camera used to capture the plurality of images, and the information on the object in each data set is point-of-sale (POS) data for the object.

According to a second aspect of the present disclosure there is provided a system for training a computational neural network to recognise objects and/or actions from images, the system comprising: a training unit, comprising: an input interface configured to receive: a data stream containing a plurality of timing indications each associated with an object and/or action; and a plurality of images each having associated timing indications; an image identification unit configured to identify a set of images from the plurality of images that each have a timing indication that correlates to a timing indication associated with an object and/or action; a data-labelling unit configured to determine, for each image of the set of images, a label comprising a value for a set of one or more variables corresponding to one or more object classes and/or specified actions in dependence on the correlation between the timing indication for the image and the timing indication associated with the object and/or action; and an output interface configured to output the labels for use in training a computational neural network to identify from images objects of the object classes and/or the specified actions.

The timing indications associated with each object and/or action and the timing indications for each image may be in the form of a timestamp, and the image-identification unit may comprise a synchronising unit configured to synchronise the timestamps associated with the images with the timestamps associated with the objects and/or actions.

Each image of the set of images used to train the computational neural network may have a timestamp within a specified time interval of a timestamp associated with an object and/or action.

The image identification unit may be configured to identify a set of primary images each having an associated timestamp within a specified time interval of a timestamp associated with an object and/or action.

The data-labelling unit may be configured to assign, to each primary image, a first set of values for the one or more variables.

The image identification unit may be further configured to identify, for each primary image, a subset of secondary images having a timestamp within a specified time interval of the timestamp for the primary image.

The data labelling unit may be further configured to assign, for each subset of secondary images, values for the one or more variables to each image in the subset determined from the first set of values for those variables assigned to the primary image for that subset.

The data labelling unit may be configured to determine the values for the one or more variables for each image in the subset of secondary images further from the difference between the timestamp of the image and the timestamp of the primary image for the subset.

The data stream may contain information on a plurality of objects and timing indications associated with each object; each of the plurality of objects may be depicted in at least one image of the plurality of received images; and the set of identified images may each have timing indications that correlate to timing indications associated with an object.

The training unit may further comprise a categorising unit configured to categorise each object into an object class of a set of object classes using the information in the data stream on that object, and the set of one or more variable values for each image may form a classification label indicating a probability for each class in the set of object classes that the image depicts an object of that class.

The data labelling unit may be configured to determine the classification label for each image from the categorisation of the object having a timing indication that correlates to the timing indication for that image.

The data labelling unit may be configured to assign, to each primary image, a first probability that the image depicts an object of the object class into which the object having a timestamp within the first specified time interval of the image has been categorised.

The data labelling unit may be configured to, for each subset of secondary images, assign to each image in the subset a probability that the image depicts an object of the same object class as the primary image for that subset.

The system may further comprise an object-recognition unit adapted to use a computational neural network to identify objects from images and configured to: receive the set of images and the classification labels output from the training unit; and use the set of images and their classification labels to train the computational neural network to identify from images objects belonging to the object classes.

The set of one or more variable values for each image may comprise a value indicating a probability that the image depicts a person performing the specified action.

The data labelling unit may be configured to assign, to each primary image, a first probability that the image depicts a person performing a specified action.

The data labelling unit may be configured to, for each subset of secondary images, assign to each image in the subset a probability that the image depicts the same specified action as the primary image for that subset.

The system may further comprise an image-data labelling unit adapted to use a computational neural network to identify actions depicted in images and configured to: receive the set of images and the labels output from the training unit; and use the set of images and their classification labels to train the computational neural network to identify from images the specified actions.

The data stream may be generated independently of the plurality of images.

The system may comprise a data-generating system configured to generate the data stream, and at least one camera configured to capture the plurality of images, wherein the data-generating system is in view of the at least one camera.

The data-generating system may be a point-of-sale system, and the information on the object in each data set may be point-of-sale (POS) data for the object.

According to a third aspect of the present disclosure there is provided a non-transitory computer-readable storage medium having stored thereon program instructions that, when executed at a computer system, cause the computer system to perform any method outlined above.

According to a fourth aspect of the present disclosure there is provided computer readable code configured to perform the steps of any of the methods outlined above when the code is run on a computer.

BRIEF DESCRIPTION OF DRAWINGS

The present invention will now be described by way of example with reference to the accompanying drawings. In the drawings.

DETAILED DESCRIPTION

Figure 1:
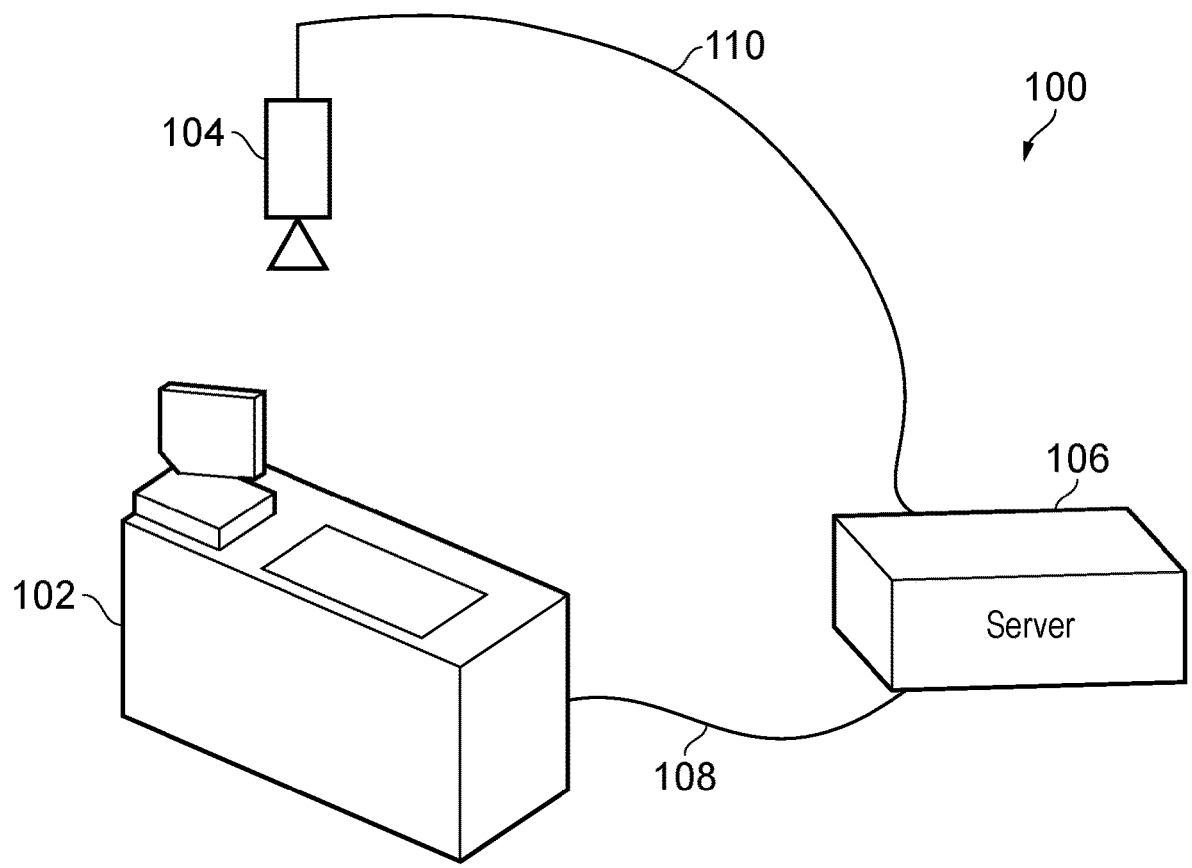
FIG. 1 shows an example of a distributed system using a POS system and camera to generate training data for a computational neural network.

The present disclosure is directed to techniques for generating labelled training data for training a computational neural network used by an image-classification or regression system to identify from images objects of a set of object classes or actions from a set of specified actions. The computational neural network could be a recurrent neural network (e.g. an LSTM network) or a non-recurrent neural network (e.g. a convolutional neural network (CNN)). The images may be digital images (e.g. captured by one or more cameras). The images could be two-dimensional (2D) images.

In the examples of the present disclosure, a data stream containing a plurality of timing indications each associated with an object and/or action is used to label a set of images (where the set of images contains at least one image depicting each object and/or action) to form a training data set. The timing indications for each object and/or action are used to identify the set of images, so that each image of the set is associated, or mapped, to a respective object and/or action. This is done by finding the images that have timing indications that correlate (i.e. map) to the timing indications of an object and/or action specified in the data stream. In one example, images may be found that have a timestamp matching, or most closely matching), the timestamp associated with each object. A label is the generated for each image in the set. Each label comprises values for a set of one or more variables. These values may take the form of a classification label or a regression value. The values of the variable(s) for each of the images in the set is determined in dependence on the correlation, or mapping, between the timing information for that image and the timing information for the associated object and/or action.

The classification or inferred regression of an image may be based on knowledge of an activity being performed at the time indicated by the timing information associated with the object. From correlating the timing information of the image with the timing information of the object, and from a priori knowledge of the activity being formed at the time indicated by the timing information, a classification label or regression value for the image may be generated that indicates the probability that the action is being depicted in the image. For instance, the data stream may be generated by a point-of-sale (POS) system, and the images may be captured by cameras having the POS system in their field of vision. The timing information associated with each object within the data stream may then be the time that the object was scanned or otherwise passed through the POS system. An image captured by a camera having a view of the POS system and having timing information that correlates with the timing information associated with an object can then be assumed to depict a person performing a scan. Thus, a classification label may be formed for the image (the possible classes for the image being, for example, (i) that the image depicts a person performing a scan; and ii) the image does not depict a person performing a scan) from the timing information in the data stream.

As another example, rather than relying on a priori knowledge of an activity being performed at the time indicated by a timing indication, the data stream may contain timing indications associated with an action. For example, if the data stream was generated by a POS system, the data stream may contain information indicating a specified action (e.g. performing a sale transaction or performing a refund) and timing information associated with that action. By correlating the timing indications of the image with the timing indications associated with the action, a classification label or regression value may be generated for the image. The classification label may indicate probabilities for a plurality of specified actions that the image depicts a person performing each of those actions.

As another example, the data stream may include information on a plurality of objects (along with timing indications associated with each object). Each object may be categorised into an object class from the information on the objects included in the data stream. From correlating the timing information of an image with the timing information associated with an object, a classification label may be generated that indicates the probability that that image depicts an object of the object class into which the object associated with that image has been categorised. That is, the timing information associated with each object in the data stream is used to link each object to an image and the information for that object included in the data stream is used to generate the classification label for the image.

Referring again to the above example in which the data stream is generated by a point-of-sale (POS) system, and the images are captured by cameras having the POS system in their field of vision, an image having timing information that maps to the timing information associated with an object categorised into an object class may be determined to depict an object of that object class.

Thus, in accordance with the examples described herein, labels for images in the form of classification labels or regression values can be generated using information contained in a data stream, negating the need for the images to be labelled manually for the purposes of generating training data for a computational neural network.

Further examples of the present disclosure will now be described with reference to FIGS. 1-5. These examples are described with reference to a POS system, with the images being captured by cameras having the POS system in their field of view. It will be appreciated that this is merely for the purposes of illustration and that the techniques described herein are applicable in a variety of contexts and applications.

FIG. 1 shows an overview of a system 100. The system comprises a point-of-sale (POS) system 102 and a camera 104, both coupled to a server 106 by communication links 108 and 110 respectively. Either or both of links 108 and 110 may be wired or wireless links. Server 108 may be local to the POS system 102 or remote of it (e.g. separated by one or more wireless networks). The server 108 could for example be a cloud-based server. The camera 104 and POS system 102 are arranged so that the POS system 102 is in the operative field of view of the camera 104. That is, images captured by the camera 104 may contain (if unobstructed) the POS system 102. The camera 102 may be a 2D camera; i.e. a camera arranged to capture 2D images. These images may be digital images.

The images captured by the camera 104 are communicated to the server 106 over the communication link 110. A data stream generated by the POS system 102 is communicated to the server 106 over the communication link 108.

Figure 2:
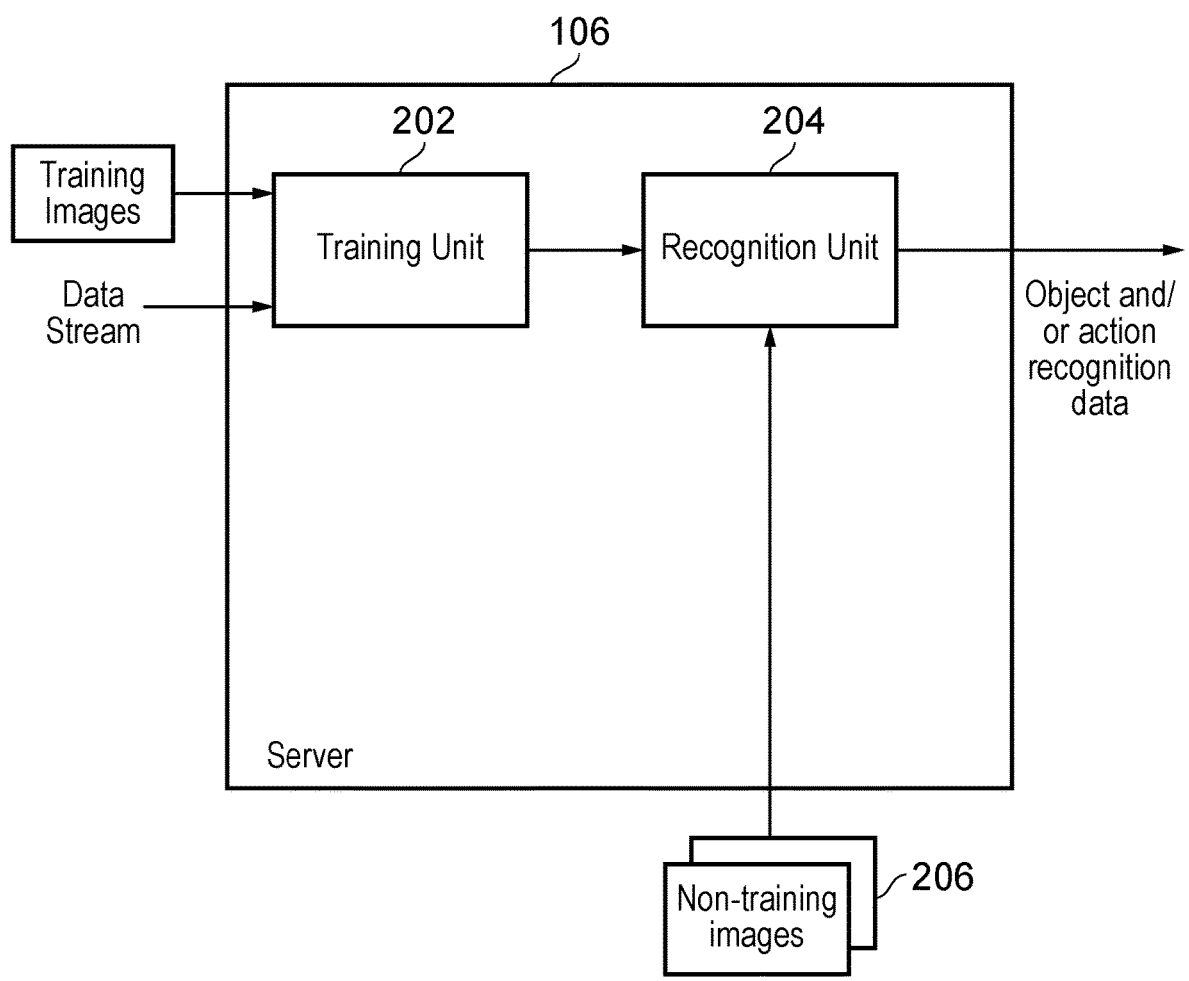
FIG. 2 shows an example of a server forming part of the system in FIG. 1 for generating the training data.

An example of the server 106 is shown in more detail in FIG. 2. The server is shown comprising a training unit 202 and a recognition unit 204. An output of the training unit 202 is coupled to an input of the recognition unit 204.

The training unit receives a set of training images outputted from camera 104 and the data stream outputted from the POS system 102. The training unit 202 operates to generate classification labels and/or regression values for a set of images of the plurality of images received from the camera 104. That is, the training unit operates to generate a set of labelled training data. This labelled training data is output (in the form of classification labels and/or regression values and associated image data) into the recognition unit 204.

The recognition unit 204 implements a computational neural network to identify objects and/or actions from input images. For example, the unit 204 may implement the computational neural network to classify input images into an image class of a set of classes. The labelled training data output from the training unit 204 is used by the recognition unit to train this computational neural network. Thus, during training, the unit 204 receives training images (and associated labels or regression values) from the training unit 202 to train the computational neural network. Following the completion of the training stage, the recognition unit implements the neural network to identify objects and/or actions from 'non-training' images 206 (e.g. by classifying 'non-training' images 206 into one or more classes or predicting regression values for non-training images). As used herein, a 'training image' refers to an image that has an associated known label (e.g. a known classification label or regression value), and a non-training image refers to an image for which the label is not known before the image is input into the neural network.

The computational neural network implemented by the recognition unit may be a recurrent neural network (such as LSTM), or a non-recurrent neural network (such as a convolutional neural network).

Figure 3:
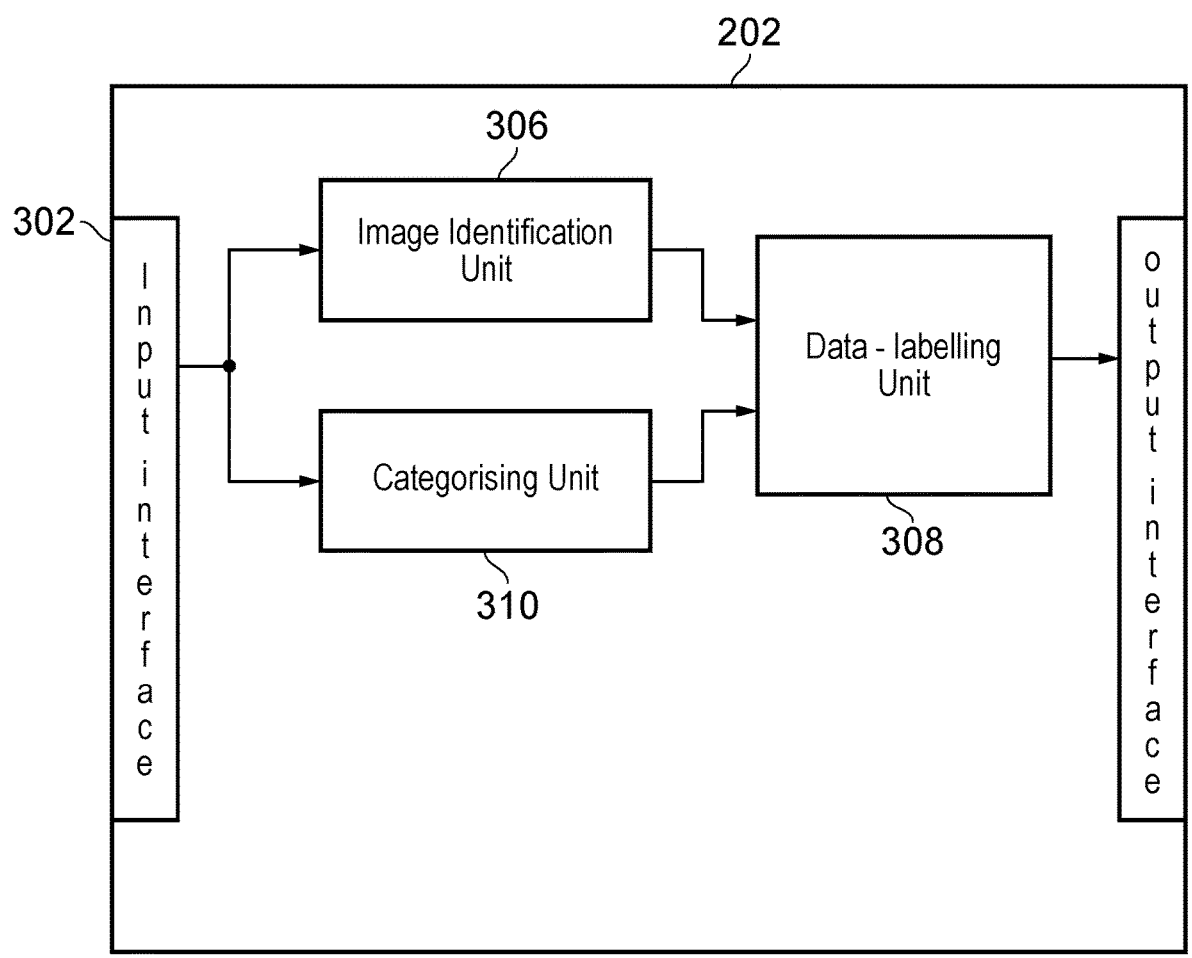
FIG. 3 shows an example of a training unit for generating the training data for the computational neural network.

An example of the training unit 202 is shown in more detail in FIG. 3. The training unit 202 comprises an input interface 302, an output interface 304, an image identification unit 306, and a data-labelling unit 308. The training unit optionally includes a categorising unit 310. Though shown as two separate interfaces in this example, the input interface 302 and output interface 304 may take the form of a single input/output interface. The input interface is coupled to an input of the image identification unit 306 and the categorising unit 310. An output of the image-identification unit 306 and the categorising unit 310 is coupled to an input of the data-labelling unit 308. An output of the data-labelling unit 308 is coupled to the output interface 304.

Figure 4:
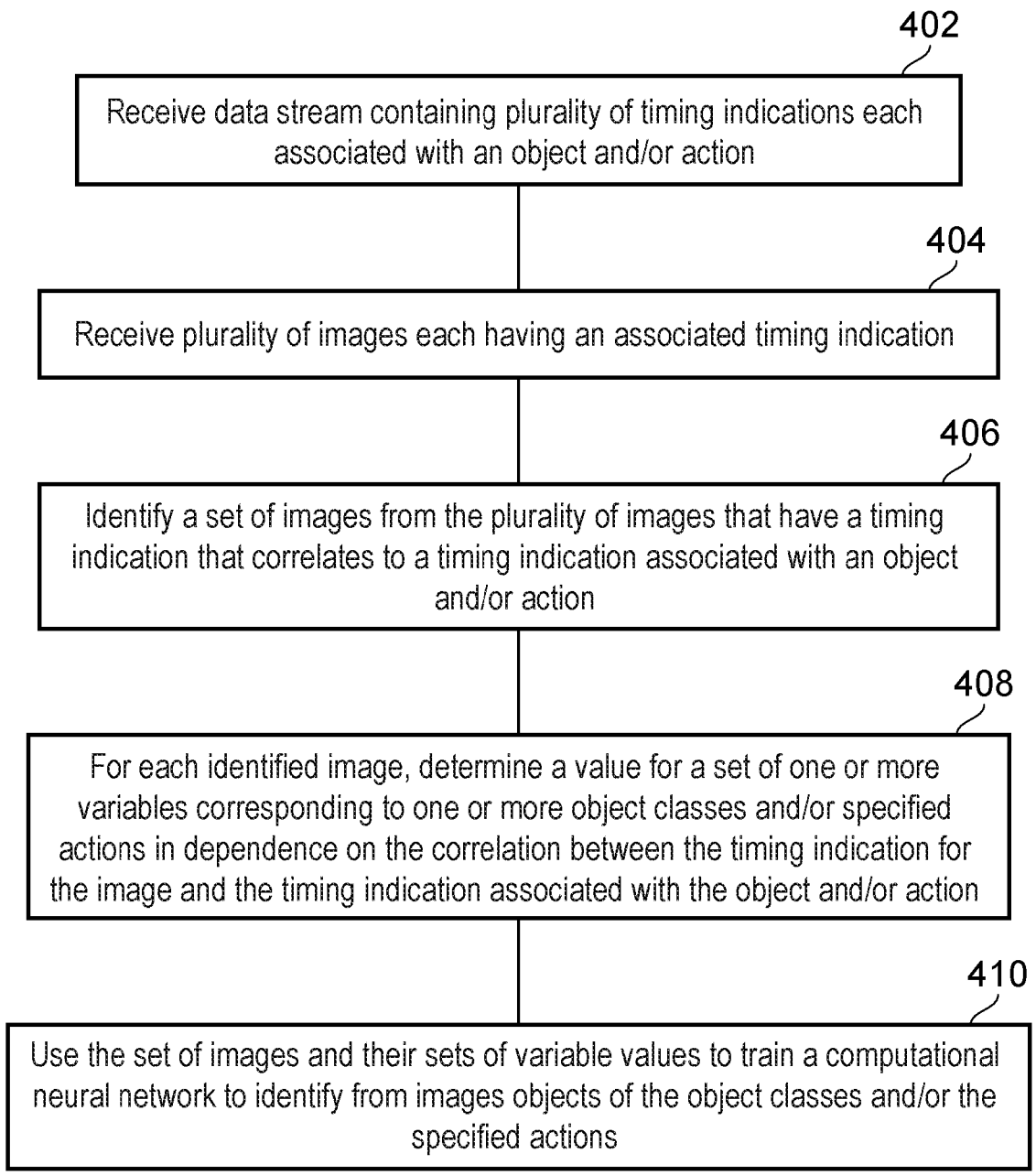
FIG. 4 shows a flowchart describing steps of a method for training a computational neural network.

The operation of the training unit 202 to generate a set of labelled training data for a computational neural network will now be explained with reference to the flowchart in FIG. 4.

At step 402, the input interface receives a data stream containing a plurality of timing indications each associated with an object and/or action.

In this example, the data stream is received from the POS system 102. The timing indication associated with an object may indicate the time that the object was scanned by, or otherwise passed through, the POS system 102 (e.g. for purchase or as part of a refund). The timing indication associated with each object may be in the form of a temporal value, such as a timestamp. The timing indication for an object may be referred to herein interchangeably as its timing information.

The data stream may additionally contain information on each object. Thus, the data stream may contain information on a plurality of objects and timing indications for each object. The information on each object may be referred to as object information. The object information for a particular object may include information that characterises the object and/or information on one or more parameters associated with the object.

The object information can include information generated by the POS system as the object passes through the POS system. The information for an object may be generated in response to the object being scanned by the POS system, for example. The object information could include one or more of: object ID (e.g. item number or serial number), price of the object to purchase, the object's weight, the manufacturer of the object, the product category of the object etc. This information may be stored on the object in the form of a computer-readable code, such as a barcode or QR code.

The data stream may further include information identifying specified actions associated with the objects. For example, the data stream may include information indicating that an object was scanned for purchase, or scanned to refund the object. Each item of information indicating a specified action may be associated with a timing indication in the data stream. If the specified action is taken with respect to an object, both that object and the specified action may be associated with the same timing indication in the data stream. For example, if an object is scanned through the POS system, both the object and the action taken with respect to that object (e.g. scanning for sale or refund) may be associated with the same timing indication in the data stream.

The timing indication and object information for an object may together form a data set associated with the object. That is, each object may be associated with a data set that includes timing information for the object and object information for the object.

At step 404, the input interface receives a plurality of images each having associated timing indications. The plurality of images are such that at least one image depicts each of the plurality of objects; i.e. each of the plurality of objects is depicted in at least one image of the received plurality of images.

In this example, the images are captured by the camera 104, which has the POS system 102 in its operative field of view. In this way, each object that is scanned by the POS system 102 can be captured in at least one of the images captured by the camera 104 (provided the images are captured by the camera at a suitably high frame rate). Depending on the frame rate, it is possible than an object will be captured in multiple images by the camera 104.

The timing indication for each image may indicate a time value associated with the image. For example, the timing indication associated with each image may indicate the time that the image was taken, or captured by the camera. The timing indication for each image could be in the form of a temporal value, or some other value indicative of time, such as a frame number for the image. The timing indication for each image could be in the form of a timestamp. The timing indication for an image may be referred to interchangeably as timing information for the image.

It will be appreciated that whilst the POS system 102 that generates the data stream is located in the operative field of view of the camera 104, the camera and POS system may nevertheless be operating independently of each other. Thus, the data stream generated by the POS system 192 may be generated independently of the images taken by the camera 104.

It is noted that the numbering of steps 402 and 404 does not imply a temporal order of these steps: in practice steps 402 and 404 may be performed successively (in either order), concurrently or otherwise so that the performance of the steps at least partially overlaps in time.

The input interface then passes the received plurality of images and data stream to the image identification unit 306.

At step 406, the image identification unit 306 operates to identify a set of images from the received plurality of images that each have timing indications that correlate to the timing indications associated with an object and/or action.

Each image in the set of identified images may have timing information that correlates to the timing information associated with an object. That is, each image may have timing information that correlates to the timing information of one of the objects having information in the data stream (in this example one of the objects scanned by the POS system 102). The timing information of an image may be said to be correlated to the timing information of an object if the timing information of the image corresponds, or coordinates, or maps to the timing information of the object. If the data stream additionally includes information associated with a specified action (e.g. scanning an object for sale or refund), then it follows each image in the identified set may additionally have timing information that correlates with the timing information associated with that action.

The timing information of an image may correlate to the timing information of an object if the indicated time values agree to within a specified amount; i.e. the time value indicated by the timing information of the image and the time value indicated by the timing information of the object are within a specified time interval of each other. This may be the case if the timing information for the image and the timing information for the object indicate time values expressed with respect to a synchronised, or common, time scale.

However, the timing information for the images and the timing information for the objects may not be synchronised, e.g. not expressed with respect to a synchronised time scale. In this case, if the temporal offset between the timescale for the object timing information and the timescale for the image timing information is known, it may still be possible to correlate the timing information for an image with the timing information for an object. If the time scales for the image information and object information are not synchronised, the image-identification unit 306 may operate to synchronise the time scales (and so synchronise the timing information for the images with the timing information for the objects so that the timing information is expressed with respect to a common time scale). This synchronisation may be performed by a synchronisation within the identification unit 306 (not shown).

An illustration of how the image identification unit 306 may operate to select the subset of images will now be described with reference to FIG. 5.

Figure 5:
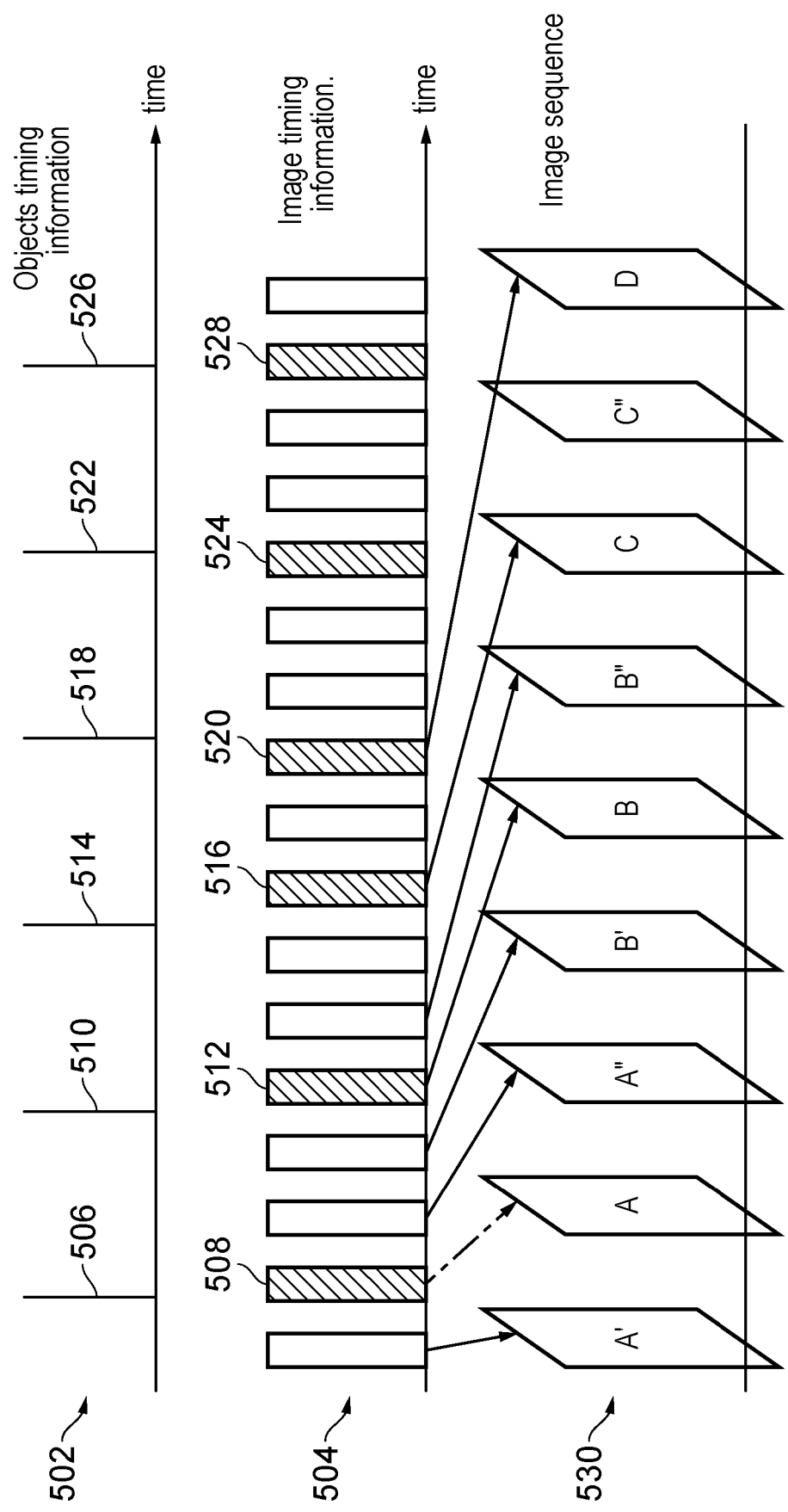
FIG. 5 shows a schematic illustration of the relationships between images, their timing information and the timing information of objects scanned by a POS system.

FIG. 5 shows a schematic illustration of the time values associated with objects as they are scanned by the POS system 102 and the time values associated with images captured by the camera 104. The time values associated with the objects are denoted generally at 502, and the time values for the images captured by camera 104 are denoted generally at 504. The sequence of images captured by the camera 104 are illustrated at 530. The time values 502 form part of the data stream generated by the POS system 102. In this example, the time values for the images and objects are taken to be expressed with respect to a synchronised time scale for the purposes of illustration. The time values of the images are shown at a lower temporal resolution than the time values associated with the objects due to the fact that, typically, POS data has a finer temporal resolution than camera data.

The image identification unit 306 may identify the images having a time value within a specified time interval of each time value 502 in the data stream. The identification unit 306 may identify only one image per time value in the data stream. That is, for each time value 502 in the data stream, the image identification unit 306 may identify the image having a time value that most closely matches that time value in the data stream. The time values for these images are shown in FIG. 5 with hatched markings.

Thus, for the time value 506, the image identification unit 306 may identify the image having the associated time value 508 (image A). For time value 510, the unit 306 may identify the image having the associated time value 512 (image B); for time value 514, the unit 306 may identify the image having the associated time value 516 (image C); for time value 518, the unit 306 may identify the image having associated time value 520 (image D); for time value 522, the unit 306 may identify the image having associated time value 524 (image E); and for time value 526, the unit 306 may identify the image having associated time value 528 (image F). Images E and F are not shown in FIG. 5.

The image-identification unit 306 outputs the identified set of images A-F, or an indication for each of the identified set of images (e.g. an image ID) to the data labelling unit 308.

At step 408, the data labelling unit 308 operates to determine values for a set of one or more variables for each image in the set of images identified at step 406 (images A-F in this example). Each of the one or more variables may correspond to a respective object class and/or specified action. Thus, the unit 308 uses the timing information in the data stream and the timing information of the received images A-F to perform object and/or action recognition on those images. The set of variable values for an image may be viewed as a label for the images that are used to train a computational neural network (described in more detail below).

In one set of examples, the set of variable values take the form of a classification label that indicates the probability that the image belongs to each class of a set of image classes. That is, the classification label for an image contains a probability indication for each image class that the image belongs to that class. Thus, if an image was capable of being classified into N possible classes, the classification label may contain an indication of N probabilities, i.e. a probability for each class (and so there would be a set of N variables associated with the image). The unit 308 may operate to generate the labels for each image identified at step 408 in dependence on the correlation between the timing information for the image and the timing information associated with the corresponding object.

Consider first the situation in which the set of one or more variables relate to specified actions. How the data labelling unit 308 may determine the values of these variables may depend on whether the data stream contains information on specified actions or not. If the data stream does not contain information on the specified actions, values of the variables may be determined by assuming a specified action is being performed at the time values indicated in the data stream.

For example, the set of image classes may contain two classes: a first class for images that depict a person performing a specified human action; and a second class for images that do not depict a person performing the specified human action. To determine the classification labels in this case, the unit 308 may equate, or associate, the timing information for each object (e.g. the time values 502) with the performance of the specified human action. Images having timing information that matches the timing information for an object may then be determined to depict a person performing that specified human action, with their classification labels being set accordingly. Thus, in this example, each image is associated with two variables: a first variable specifying the probability the image depicts a person performing a specified human action; and a second variable specifying the probability the image does not depict a person performing a specified human action.

In the present example, because the timing information 502 for the objects indicates the time those objects were scanned by the POS system 102, the data labelling unit 308 may equate the timing information for each object in the data stream with the action of a human performing a scan of an object at the POS system 102. Images A-F (having timing information that matches the timing information of a respective object) may therefore be determined to depict a person performing a scan, since the POS system 102 is in the field of view of the camera 104 that captures the images. The label generating unit 308 may therefore determine the classification labels for each of images A-F by assigning to each of those images a probability that the images depict a person performing the specified human action. That probability could be '1', for example. In other examples, the assigned probability could be some other value, such as a value greater than 0.7, 0.8, 0.9 or some other threshold. To complete the classification label for each image, the unit 308 may further assign to each of images A-F a probability that the images do not depict a person performing the specified human action. This probability may be chosen so that the sum of the probabilities for each class sum to 1.

If the data stream includes information identifying specified actions that are associated with timing indications, the data labelling unit 308 may determine the values of the variables from the correlation of the timing indications of the images A-F with the timing indications associated with the information identifying the specified actions that is included within the data stream. For example, the data stream may include, for each object: information on the object; information identifying a specified action taken with respect to that object (e.g. that the object was scanned for sale or refund); and a timing indication for the object (e.g. the time the object was scanned by the POS system). The data-labelling unit 308 may then assign to the image having a matching timing indication a probability that that image depicts a person performing the specified human action.

Rather than using the timing information from the POS data to identify specified human actions, the object information and timing information from the POS data may be used to analyse the images to perform object recognition.

To do this, the training unit 202 may comprise a categorising unit 310, shown in FIG. 3. The categorising unit 310 receives the object information in the data stream (or it may receive the whole data stream). The categorising unit 310 operates to categorise each object scanned by the POS system 102 into an object class using the information on that object contained in the data stream.

There may be a fixed number of object classes that form a set of object classes. The types of object class could include, for example: the category of the object (e.g. whether the object is a food item, clothing item etc.); a cost bracket for the object; a weight bracket for the object etc. Each of the object classes into which the categorising unit 310 can categorise an object from its object information may correspond to a class in the classification label generated by the categorising unit 310.

An indication of which class each object has been categorised into is communicated from the categorising unit 310 to the data labelling unit 308. Thus, each object scanned by the POS system 102 may be associated with: (i) object information (determined by the POS system when the object is scanned and included in the data stream); (ii) timing information (determined by the POS system and included in the data stream); and (iii) an indication of the class into which the object has been categorised (determined by the categorising unit 310 using the object information).

As described above, the image identification unit 306 identifies the set of images A-F that have timing information that (most closely) matches the object timing information in the data stream, thereby associating each of the images A-F with an object. The data labelling unit 308 may then operate to determine, for each of the images A-F, a classification label, where each classification label indicates a probability for each class of the set of object classes that the image depicts an object of that class. Thus, each of the variables associated with an image may correspond to a respective object class, with the value of that variable indicating the probability that the image depicts an object belonging to that object class.

The data labelling unit 308 may determine the classification label for each of the images A-F from the categorisation of the objects associated with those images by the categorising unit 310. That is, the classification label for each image A-F may be determined from the categorisation of the object having timing information that correlates, or matches, the timing information for that image. For instance, referring to FIG. 5, the label for image A can be determined from the categorisation of the object having a time value 506 that matches the time value 508 for that image. In other words, if each object is scanned by the POS system 102 at the time indicated by the timing information for that object (e.g. time 506), then an image having timing information (e.g. time 508) that matches the timing information for that object is determined to depict an object of the object class into which the object scanned by the POS system has been categorised.

The data labelling unit 308 may therefore determine the labels for each of images A-F by assigning to each of those images probabilities that the image depicts an object of each class of the set of object classes.

Of course, rather than taking the form of a classification label, the set of one or more variables may take the form of a regression value. That is, the data labelling unit 308 may generate an image label comprising a regression value for each of the images identified at step 406. The regression value may be a continuous variable indicating the probability that an image depicts a person performing a specified action (e.g. the probability that the image depicts a person performing a scan). In this case the regression value may be determined with or without the use of information in the data stream identifying the specified actions.

Thus, in summary, the image labels generated by the unit 308 may take the form of classification labels or regression values. The classification labels or regression values are then output from the unit 308 and output from the training unit 202 via the output interface 304 to the recognition unit 204.

At step 410, the recognition unit 204 uses the sets of variable values (e.g. classification labels or regression values) and their associated images (in this example images A-F) as training data to train the computational neural network implemented by the unit 204 to recognise from non-training images objects belonging to the set of object classes and/or specified actions.

For example, if the sets of variable values take the form of a classification label, the computational neural network can be trained to classify a non-training image into an image class of a set of image classes. Each image class may correspond to a respective object class or specified action. If the sets of variable values take the form of a regression value, the computational neural network may be trained to output the value of a continuous variable for non-training images (e.g. indicating the probability that the image depicts a person performing a specified action).

In the above examples, the image identification unit 306 identifies a set of images A-F that have time values that most closely correlate with time values in the data stream, so that a single image is identified per time value in the data stream. It is possible for the image identification unit to identify further images from each of the images A-F and to determine classification labels for each of those images in dependence on the labels assigned to the images A-F. Generating labels for additional images has the advantage of increasing the size of the training data set that can be generated from the POS data.

To differentiate between the images A-F and the further images identified from those images, the images A-F will be referred to as primary images, and the images identified from images A-F will be referred to as secondary images.

Thus, the image identification unit 306 may identify, for each primary image, a subset of one or more secondary images. Each secondary image within a subset may have a time value within a specified time interval of the primary image for that subset. Another way to identify each subset of secondary images is to select the ±n adjacent images of each primary image. For example, for primary image A, the subset of secondary images A' and A" may be identified; for primary image B, the subset of secondary images B' and B" may be identified etc.

Thus, the secondary images for each subset have timing information that may be said to be correlated, or matched, to a timing indication in the data stream. For instance, each secondary image within a subset may have a time value that is within a specified time interval of the time value associated with an object. That time interval may be larger than the time interval between the time value associated with the primary image and the time value of the object. In other words, the time values for secondary images may not match the time values for the objects as closely as the time values for the primary images do.

The data-labelling unit 308 may determine the labels of each secondary image in a subset from the label of the primary image for that subset. The label for each image in the subset may be determined from the difference between the time value of the primary image in the subset (e.g. image A) and the time value for the secondary image in the subset (e.g. images A' and A"). The label could be determined as a function of both this time difference and the label of the primary image.

For instance, if a first probability has been assigned to a primary image that the image belongs to a particular image class (e.g. the image depicts a person performing a specified activity, or the image depicts an object belonging to an object class), then a probability can be assigned to each secondary image in the subset that the secondary image belongs to that same image class (e.g. the image also depicts a person performing the same specified activity, or the image also depicts an object belonging to the same object class). This is because it probable that an object being scanned at the POS system 102 and/or the scanning action performed by a person operating the POS system is likely to be depicted in multiple successive images captured by the camera 104 (due to the time taken to perform an object scan).

The probability for each secondary image in the subset may be calculated as a function of the probability assigned to the primary image in the subset (e.g., '1'), and the time difference between the secondary image and primary image. In other examples, the probability assigned to each secondary image may be predetermined based on the position of that image relative to the primary image (e.g., the image number of the secondary image relative to the image number of the primary image).

As another example, if a first regression value has been assigned to a primary image, then a regression value can be assigned to each secondary image in the subset in dependence on the regression value for the primary image of that subset and the time difference between the secondary image and the primary image.

Thus, in general, values for a first set of one or more variables (classification labels or regression values) may be assigned to the primary images. Then, for each subset, a set of variable values can be assigned to each secondary image in the subset in dependence on the variable values assigned to the primary image of that subset, and optionally further in dependence on the time difference between the secondary image and the primary image of the subset.

The sets of variable values for the primary images and secondary images (along with the primary and secondary images themselves) can then be input into recognition unit 204 as training data to train the computational neural network implemented by that unit.

The above examples illustrate how a data stream containing timing information and object information can be used to generate labels for images captured by a camera to generate a training data set for a computational neural network. By using this timing and object information, labels can be generated for images computationally, negating the need for a human to manually label the images. This can lead to the generation of large training data sets with reduced effort and cost. Moreover, the techniques described herein are applicable to images captured from existing video and camera systems (e.g. for security purposes), enabling labelled data sets to be generated from images generated from existing apparatus.

Though the above examples have been described with reference to a POS system, and wherein the object information is POS data, it will be appreciated that the techniques described herein are applicable to a variety of systems in which a data set containing temporal and object information is generated from objects in view of a camera system.

The above examples refers to images captured from a camera. It will be understood that the cameras (e.g. camera 102) may be video cameras that capture video data formed of a sequence of frames, where a frame is an example of an image as used herein. That is, the image(s) captured by the camera may be frames forming part of a video sequence.

Server 106 may be configured to receive images captured from multiple cameras and data streams generated from multiple POS systems. Each POS system may be in the operational field of view of a respective camera. Alternatively, multiple POS systems may be in the operative field of view of a single camera.

The apparatus 106 and 202 are shown as comprising a number of functional blocks. This is schematic only and is not intended to define a strict division between different logic elements of such entities. Each functional block may be provided in any suitable manner. It is to be understood that intermediate values described herein as being formed by a particular module/unit etc. need not be physically generated by the module at any point and may merely represent logical values which conveniently describe the processing performed by the module between its input and output.

The modules/units described herein may be configured to perform any of the methods described herein. Generally, any of the functions, methods, techniques or components described above can be implemented in software, firmware, hardware (e.g., fixed logic circuitry), or any combination thereof. The terms "module," "element", "unit", "block" and "logic" may be used herein to generally represent software, firmware, hardware, or any combination thereof. In the case of a software implementation, the module, element, unit, block or logic represents program code that performs the specified tasks when executed on a processor. The algorithms and methods described herein could be performed by one or more processors executing code that causes the processor(s) to perform the algorithms/methods. The code may be stored on a non-transitory computer-readable storage medium. Examples of a non-transitory computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system for training a computational neural network to recognise objects or actions from images, the system comprising:
    a training unit, comprising:
        an input interface configured to receive: a plurality of images captured from one or more cameras, each image having an associated timestamp indicating a time the image was captured; and a data stream containing a plurality of timestamps each associated with an object or action, the data stream being generated by a system in an operative field of view of the one or more cameras;
        an image identification unit configured to identify from the plurality of images a set of images that each have a timestamp that correlates to a timestamp associated with an object or action from the data stream;
        a categorising unit configured to categorise each object into an object class of a set of one or more specified object classes using information in the data stream on that object, wherein an image label, for each image of the set of images, forms a classification label indicating a probability for each object class that the image depicts an object of that object class;
        a data-labelling unit configured to determine, for each image of the set of images, the image label that indicates the probability the image depicts: (i) an object of each of the set of one or more specified object classes; or (ii) a specified human action in dependence on the correlation between the timestamp for the image and the timestamp associated with the object or action from the data stream, wherein the data-labelling unit is configured to determine the classification label for each image from the categorisation of the object having a timestamp in the data stream that correlates to the timestamp for that image; and
        an output interface configured to output the image labels for use in training a computational neural network to identify from images objects of the object classes or the specified actions.

2. A system as claimed in claim 1, wherein the image identification unit comprises a synchronising unit configured to synchronise the timestamps associated with the images with the timestamps associated with the objects or actions from the data stream.

3. A system as claimed in claim 1, wherein each image of the set of images used to train the computational neural network has a timestamp within a specified time interval of a timestamp associated with an object or action from the data stream.

4. A system as claimed in claim 1, wherein the image identification unit is configured to identify a set of primary images each having an associated timestamp within a specified time interval of a timestamp associated with an object or action from the data stream.

5. A system as claimed in claim 4, wherein the data-labelling unit is configured to assign, to each primary image, a probability the image depicts: (i) an object of each of a set of one or more specified object classes; or (ii) a specified human action.

6. A system as claimed in claim 4, wherein the image identification unit is further configured to identify, for each primary image, a subset of secondary images having a timestamp within a specified time interval of the timestamp for the primary image.

7. A system as claimed in claim 6, wherein the data-labelling unit is further configured to assign, for each subset of secondary images, a probability to each image in the subset that the image depicts: (i) an object of each of a set of one or more specified object classes; or (ii) a specified human action determined from the probabilities assigned to the primary image for that subset.

8. A system as claimed in claim 7, wherein the data-labelling unit is configured to assign the probabilities to each image in the subset of secondary images further from the difference between the timestamp of the secondary image and the timestamp of the primary image for the subset.

9. A system as claimed in claim 1, wherein: the data stream contains information on a plurality of objects and timestamps associated with each object; each of the plurality of objects is depicted in at least one image of the plurality of received images; and the set of identified images each have timestamps that correlate to timestamps associated with an object from the data stream.

10. A system as claimed in claim 1, wherein the image identification unit is configured to identify a set of primary images each having an associated timestamp within a specified time interval of a timestamp associated with an object or action from the data stream, wherein the data-labelling unit is configured to assign, to each primary image, a first probability that the image depicts an object of the object class into which the object, having a timestamp within the specified time interval of the image, has been categorised.

11. A system as claimed in claim 10, wherein the image identification unit is further configured to identify, for each primary image, a subset of secondary images having a timestamp within a specified time interval of the timestamp for the primary image, wherein the data-labelling unit is configured to, for each subset of secondary images, assign to each image in the subset a probability that the image depicts an object of the same object class as the primary image for that subset.

12. A system as claimed in claim 1, wherein the system further comprises an object-recognition unit adapted to use a computational neural network to identify objects from images and configured to: receive the set of images and the image labels output from the training unit; and use the set of images and their image labels to train the computational neural network to identify from images objects belonging to the object classes.

13. A system as claimed in claim 1, wherein the image label for each image in the set of images comprises a value indicating a probability that the image depicts a person performing the specified action.

14. A system as claimed in claim 13, wherein the image identification unit is configured to identify a set of primary images each having an associated timestamp within a specified time interval of a timestamp associated with an object or action from the data stream, wherein the data-labelling unit is configured to assign, to each primary image, a first probability that the image depicts a person performing a specified action.

15. A system as claimed in claim 14, wherein the system further comprises an image-data labelling unit adapted to use a computational neural network to identify actions depicted in images and configured to: receive the set of images and the image labels output from the training unit; and use the set of images and their image labels to train the computational neural network to identify from images the specified actions.

16. A system as claimed in claim 1, wherein the system comprises a data-generating system configured to generate the data stream, wherein the data-generating system is in an operative field of view of the one or more cameras.

17. A method of training a computational neural network used by an object or action recognition system, the method comprising:
   receiving from one or more cameras a plurality of images each having an associated timestamp indicating a time the image was captured;
   receiving a data stream containing a plurality of timestamps each associated with an object or action, the data stream being generated by a system in an operative field of view of the one or more cameras;
   identifying from the plurality of images a set of images that each have a timestamp that correlates to a timestamp associated with an object or action from the data stream;
   categorising each object into an object class of a set of one or more specified object classes using information in the data stream on that object, wherein an image label, for each image of the set of images, forms a classification label indicating a probability for each object class that the image depicts an object of that object class; and
   determining, for each image of the set of images, an image label that indicates the probability the image depicts: (i) an object of each of the set of one or more specified object classes; or (ii) a specified human action in dependence on the correlation between the timestamp for the image and the timestamp associated with the object or action from the data stream, wherein the classification label is determined for each image from the categorisation of the object having a timestamp in the data stream that correlates to the timestamp for that image.

18. A non-transitory computer-readable storage medium having stored thereon program instructions that, when executed at a computer system, cause the computer system to perform a method of training a computational neural network to identify from images objects or actions, the method comprising:
   receiving from one or more cameras a plurality of images each having an associated timestamp indicating a time the image was captured;
   receiving a data stream containing a plurality of timing indications each associated with an object or action;
   identifying from the plurality of images a set of images that each have a timestamp that correlates to a timestamp associated with an object or action from the data stream;
   categorising each object into an object class of a set of one or more specified object classes using information in the data stream on that object, wherein an image label, for each image of the set of images, forms a classification label indicating a probability for each object class that the image depicts an object of that object class; and
   determining, for each image of the set of images, an image label that indicates the probability the image depicts: (i) an object of each of the set of one or more specified object classes; or (ii) a specified human action in dependence on the correlation between the timestamp for the image and the timestamp associated with the object or action from the data stream, wherein the classification label is determined for each image from the categorisation of the object having a timestamp in the data stream that correlates to the timestamp for that image.

* * * * *